US012767161B2

(12) United States Patent
Schmidt et al.

(10) Patent No.: US 12,767,161 B2
(45) Date of Patent: Oct. 20, 2026

(54) METHOD AND PROCESSOR CIRCUIT FOR CONTROLLING A CONFIGURATION STATE OF A VEHICLE DEVICE OF A MOTOR VEHICLE IN ACCORDANCE WITH A CALIBRATION STATE OF THE VEHICLE DEVICE IN QUESTION, AND MOTOR VEHICLE WHICH CAN BE OPERATED ACCORDINGLY

(71) Applicant: AUDI AG, Ingolstadt (DE)

(72) Inventors: Valentin Schmidt, Neuburg a.d. Donau (DE); Marcel Debelec, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 3 days.

(21) Appl. No.: 18/703,243

(22) PCT Filed: Oct. 19, 2022

(86) PCT No.: PCT/EP2022/079132
§ 371 (c)(1),
(2) Date: Apr. 19, 2024

(87) PCT Pub. No.: WO2023/067022
PCT Pub. Date: Apr. 27, 2023

(65) Prior Publication Data

US 2025/0229794 A1 Jul. 17, 2025

(30) Foreign Application Priority Data

Oct. 22, 2021 (DE) ..................... 10 2021 127 459.1

(51) Int. Cl.
*B60W 50/14* (2020.01)
*B60K 35/28* (2024.01)
*B60W 50/00* (2006.01)

(52) U.S. Cl.
CPC ............. *B60W 50/14* (2013.01); *B60K 35/28* (2024.01); *B60W 2050/0083* (2013.01)

(58) Field of Classification Search
CPC .......... B60W 50/14; B60W 2050/0083; B60K 35/28
See application file for complete search history.

(56) References Cited

U.S. PATENT DOCUMENTS

2015/0151669 A1* 6/2015 Meisner ............... G06V 20/584 701/49
2019/0347829 A1* 11/2019 Michiguchi ............... G06T 7/80

FOREIGN PATENT DOCUMENTS

DE 195 026 296 C1 4/1996
DE 10 2005 024 617 A1 11/2006
(Continued)

OTHER PUBLICATIONS

English Machine Translation of DE-102020118583-A1 (Year: 2022).*
(Continued)

*Primary Examiner* — Andrew J Cromer
(74) *Attorney, Agent, or Firm* — STAAS & HALSEY LLP

(57) ABSTRACT

A method for controlling a configuration state of at least one vehicle device of a motor vehicle, wherein calibration state data which signal a current calibration state of a self-calibration routine carried out by the calibration device during a driving operation of the motor vehicle are received from a calibration device of the vehicle device in question. A progress value is assigned to the respective current calibration state data in accordance with a predefined evaluation rule and a configuration data set which defines a configuration state of the vehicle device in question is selected from a plurality of predefined configuration data sets depending on the current progress value, and the vehicle device is configured by the selected configuration data set,
(Continued)

wherein at least one function parameter is set according to the respective configuration data set for the execution of the least one sub-function.

20 Claims, 4 Drawing Sheets

(56) References Cited

FOREIGN PATENT DOCUMENTS

| | | | | | |
|---|---|---|---|---|---|
| DE | 10 2011 017 687 | A1 | | 10/2012 | |
| DE | 10 2011 017 697 | A1 | | 10/2012 | |
| DE | 10 2013 105 506 | A1 | | 12/2014 | |
| DE | 10 2014 003 585 | A1 | | 9/2015 | |
| DE | 10 2014 014 295 | A1 | | 3/2016 | |
| DE | 10 2018 117 290 | A1 | | 1/2020 | |
| DE | 10 2020 000 292 | A1 | | 9/2020 | |
| DE | 10 2019 110 938 | A1 | | 10/2020 | |
| DE | 10 2019 207 612 | A1 | | 11/2020 | |
| DE | 10 2021 127 459.1 | | | 10/2021 | |
| DE | 102020118583 | A1 | * | 1/2022 | ............. B60K 35/60 |
| WO | PCT/EP2022/079132 | | | 10/2022 | |

OTHER PUBLICATIONS

International Preliminary Report on Patentability mailed May 2, 2024 for International Application No. PCT/EP2022/079132.
International Search Report dated Feb. 17, 2023 for International Application No. PCT/EP2022/079132.
German Office Action dated Oct. 10, 2022 for German Application No. 10 2021 127 459.1.

* cited by examiner

METHOD AND PROCESSOR CIRCUIT FOR CONTROLLING A CONFIGURATION STATE OF A VEHICLE DEVICE OF A MOTOR VEHICLE IN ACCORDANCE WITH A CALIBRATION STATE OF THE VEHICLE DEVICE IN QUESTION, AND MOTOR VEHICLE WHICH CAN BE OPERATED ACCORDINGLY

CROSS REFERENCE TO RELATED APPLICATIONS

This application is a U.S. national stage of International Application No. PCT/EP2022/079132, filed on Oct. 19, 2022. The International application claims the priority benefit of German Application No. 10 2021 127 459.1 filed on Oct. 22, 2021. Both the International Application PCT/EP2022/079132 and the German Application 10 2021 127 459.1 are incorporated by reference herein in their entirety.

BACKGROUND

Disclosed herein is a method and a processor circuit for controlling a configuration state of at least one vehicle device of a motor vehicle. The controller of the configuration state uses information from a self-calibration routine which performs an automated calibration of at least one vehicle device and/or at least one upstream ancillary device in the motor vehicle during driving operation of the motor vehicle. Disclosed herein also is a motor vehicle having a corresponding processor circuit.

Self-calibration of a headlamp system of a motor vehicle is known, for example, from DE 10 2013 105 506 A1. This publication describes how the headlamp system can also be adjusted retrospectively, i.e. following its installation and following the handover of the motor vehicle to a vehicle user, by means of a self-calibration routine in order to adapt the headlamp system to the actual installation situation in the motor vehicle. The self-calibration can be performed iteratively, i.e. calibration steps can be carried out repeatedly, but, as the self-calibration progresses, this results in increasingly fewer changes or increasingly lower delta values in the adjustment of the headlamp system.

However, at the start of the self-calibration, the headlamp system is in an unconfigured or only partially configured state, and therefore, for some sub-functions such as, for example, the exclusion of another vehicle from the beam of light (glare-free full beam), the precision of the cut-off point of the headlamps can still be so inexact that an oncoming road user could be dazzled.

Following the assembly and commissioning of the vehicle at the factory, such a sub-function of the headlamp system is available from kilometer 0 or from the start of use of the motor vehicle. However, the sub-functions are in some cases dependent on a complete calibration of the headlamp system or a minimum calibration quality, i.e. a limited maximum tolerance. Similarly, even in the case of a motor vehicle already completely calibrated on delivery, a self-calibration can nevertheless continue to run during driving operation, since inadequate calibration states can also occur from time to time during driving operation, i.e. the self-calibration compensates, for example, for a setting behavior or similar during driving operation.

Likewise, in preparation for a subsequent enabling of a sub-function (functions on demand), the calibration must already have been performed, even if the function has not yet been activated by the customer.

In order to ensure that a sufficient calibration quality is provided for each sub-function, a correspondingly complex initial calibration must therefore already be carried out during the manufacture of a motor vehicle. Costs are therefore incurred for production and customer service during commissioning, including the initial calibration of a headlamp system.

A deficient calibration of a headlamp system can be detected, for example, by means of a method from DE 10 2020 000 292 A1. This publication also describes how an incorrectly calibrated headlamp can subsequently be correctly aligned automatically by means of actuators in order to restore the calibration.

An adjustment or calibration of a headlamp system during driving operation of a motor vehicle is also known from DE 10 2014 003 585 A1.

From DE 10 2019 207 612 A1, it is known for individual driver assistance functions to be enabled selectively in a motor vehicle only if a self-calibration algorithm of a sensor used by the respective driver assistance function is successfully completed and this is also confirmed. It is thus ensured that a driver assistance function is enabled only if the sensor required for this purpose has successfully ended its self-calibration during the driving operation of the motor vehicle. However, this binary disabling and enabling of driver assistance functions has the disadvantage that a long period of time sometimes elapses in which the driver assistance function in question is not yet available in the motor vehicle.

SUMMARY

An aspect of the invention is to increase the availability of at least one sub-function of at least one vehicle device of a motor vehicle even when the sub-function is dependent on a self-calibration of the vehicle device and/or a self-calibration of an ancillary device, for example a sensor, assigned to the vehicle device.

Disclosed herein is a method for controlling a configuration state of at least one vehicle device of a motor vehicle. Calibration state data which signal a current calibration state of a self-calibration routine performed by the calibration device in question during a driving operation of the motor vehicle are in each case received once or repeatedly by a processor circuit (or processor) from a calibration device of the vehicle device in question and/or of an ancillary device used by the vehicle device. As described above in connection with a headlamp system and a sensor, the method assumes that at least one vehicle device is present in the motor vehicle and a self-calibration routine is carried out in the vehicle device during the driving operation of the motor vehicle, i.e. while the motor vehicle is already being used by a vehicle user. Additionally or alternatively, a self-calibration routine can also be carried out during the driving operation of the motor vehicle in at least one ancillary device which is used by the vehicle device in question for providing at least one sub-function, i.e., for example, in a sensor coupled to the vehicle device. In other words, it is assumed in the method that a calibration quality or a precision or adjustment of at least one component in the vehicle device and/or the ancillary device is continuously and/or gradually improved by the self-calibration routine during the driving operation. This is also monitored by the processor circuit, whereby the processor circuit receives or monitors calibration states of the self-calibration routine in question. The processor circuit can be provided, for example, in a control unit of the motor vehicle or in a central computer of the motor vehicle (known as the head unit) or in a backend server, i.e. a stationary computer of the Internet. The processor circuit can also be implemented as a distributed circuit, partially, for example, in the backend server and partially in the central computer. The components of a distributed circuit of this type can be coupled, for example, via communication connections, for example Internet connections and/or radio connections and/or fieldbus connections.

In order to adapt the mode of operation of the at least one vehicle device to the currently available calibration quality or adjustment of the vehicle device in question and/or of the ancillary device in question, the method comprises assigning a progress value by the processor circuit to the respective current calibration state data in accordance with a predefined evaluation rule. The calibration state data are therefore mapped onto a progress value. A configuration data set of this type is selected from a plurality of predefined configuration data sets depending on the current progress value, the configuration data set then defining a configuration state of the vehicle device in question, whereby the vehicle device is configured by means of the selected configuration data set. At least one function parameter of the at least one sub-function is set according to the configuration data set in question for the performance of the sub-function. In other words, the calibration state data are then evaluated or analyzed in order to determine how far the self-calibration has already progressed. This provides the progress value. Unlike the prior art, wherein a sub-function is not enabled or is kept blocked until a specific progress value is attained, it is assumed here instead that the sub-function can already be executed in advance, and only the manner in which it is executed is adapted to the current calibration state by adapting, modifying or updating a function parameter of the sub-function in question by the respective configuration data set. A permitted minimum distance, for example, of a cut-off point of the headlamp light in relation to a detected oncoming road user can be set or defined, for example, in accordance with the progress value. The greater the progress of the self-calibration, the narrower or closer the cut-off point can be brought to a detected oncoming road user, since a corresponding precision of the "adaptive high beam" sub-function is available in the alignment of the cut-off point due to the advanced progress of the self-calibration. Further examples of vehicle devices which can be configured by the method depending on the calibration states are given in the continuing description below. The function parameter does not therefore decide whether the sub-function is or is not enabled, but instead only a distance value, for example, and/or a time value and/or a power value is set, although the sub-function is essentially made available or enabled.

Advantageously, a sub-function does not require a hard shutdown or does not need to remain blocked in a motor vehicle until a sensor has completely executed its self-calibration. Instead, the sub-function in question can be adapted with a corresponding configuration data set to the currently available calibration quality or the current progress value of the self-calibration depending on the current progress of the self-calibration, by modifying or setting or updating at least one function parameter. At least one, for example a plurality of intermediate stages between the "completely blocked" state and the "completely enabled" state are therefore present in the configuration. Two configuration data sets or more than two configuration data sets, for example, can be provided, so that, for correspondingly different progress values, i.e. two or more than two different progress values, a different configuration data set, and therefore in each case a different value, can be set in each case for the at least one function parameter of the sub-function. A continuous adaptation of at least one function parameter can also be performed depending on a continuous modification of the progress value when the progress value is represented, for example, digitally as an integer or as a floating-point value. The progress value can then, for example, be mapped onto or converted to a corresponding value of the respective function parameter by a characteristic curve.

The described calibration device can be derived from the prior art, as mentioned, for example, in the introduction to this description. It can, for example, be software which can be executed by a control unit. The self-calibration routine per se can also be designed in a known manner by a person skilled in the art and can be based e.g. on a program code.

In one aspect, the evaluation rule comprises mapping the current calibration state data onto a predetermined value interval by which the progress of the self-calibration routine is described as a numerical value, and the progress value is thereby assigned to the calibration state data from the value interval. Combining the calibration state data from the respective self-calibration routine into a single numerical value from a previously known numerical interval offers the advantage that the selection of a suitable configuration data set can be controlled by a single numerical value. The calibration state data which are received from a self-calibration routine can differ according to the vehicle device and/or ancillary device, so that the configuration data set can be chosen by the described intermediate step of the evaluation rule in accordance with the progress value, regardless of the design or structure of the calibration state data. A person skilled in the art is thus provided with a tool with which the selection of the configuration data set can still be controlled uniformly by the resulting numerical value for different vehicle devices and/or ancillary devices which provide differently structured calibration state data (for example different data formats and a different value indications and/or measured values). The mapping can be performed, for example, by assigning value intervals of values which are indicated in the calibration state data in each case to a predetermined numerical value. The numerical value can lie, for example, within a range from zero percent to 100 percent, wherein zero percent indicates the initial calibration state or uncalibrated state, and 100 percent can indicate a completed self-calibration routine.

One aspect comprises determining, by a threshold value comparison on the basis of the determined progress value, which of the predefined configuration data sets is to be selected, wherein a different configuration data set of the configuration data sets is assigned in each case to the plurality of different threshold values. Whether the progress value already lies above or below a respectively predefined threshold or threshold value can be determined by a threshold value comparison. Two or three or more than three different threshold values, for example, can be defined. When the progress value then in each case exceeds or falls below a threshold value, a different configuration data set is thereby selected and is then used or employed in the vehicle device to configure the at least one sub-function, i.e. the at least one function parameter is set or modified in the respective sub-function according to the currently selected configuration data set. The configuration of the respective vehicle device can thus be updated or readjusted successively or gradually depending on the progress according to the progress value. In particular, not only is a switchover performed by the plurality of configuration data sets between a blocked and an enabled sub-function, but also at least one intermediate step takes place during the configuration, so that, although the sub-function is already executable or can be activated for execution, the at least one function parameter is provided with at least two different values by different configuration data sets so that the respective sub-function behaves differently in each case during execution.

In this connection, one aspect comprises setting a parameter value of the at least one function parameter of the sub-function by the respective calibration data set in at least one sub-function, wherein a configuration of a feature of the sub-function (e.g. brightness, dimension) and/or a safety distance for an adjustment procedure (e.g. a distance to a detected road user) and/or an environment of use for the sub-function (e.g. traffic density, number of surrounding road users) is set by the parameter value during an execution of the sub-function. In relation to the configuration of a feature, a brightness value, for example, and/or a size or dimension of an output projection can be set. If, for example, a calibration quality or a self-calibration of a projector for projecting a light beam onto a road surface is not yet fully concluded, a detail resolution, for example, can still be too low to produce a projection that is smaller than a specific dimension. If, as a feature of the sub-function, the dimension of the projection is chosen here as correspondingly greater, the inadequate detail resolution will be made less apparent as a result. A safety distance can relate, for example, to the distance to a detected road user when this involves the setting or alignment of a cut-off point of an adaptive headlamp light by means of, for example, a matrix headlamp. An environment of use can be varied so that, for example, a value for a traffic density, for example a number of surrounding road users, is predefined and must not be exceeded when the sub-function is active, for example an automated transverse guidance (steering) and/or an automated longitudinal guidance (acceleration and/or braking). Use of the sub-function in an excessively complex driving environment can thereby be prevented while the self-calibration is not yet fully completed. This can be advantageous, in particular, for a control unit of a driver assistance system and/or a control unit for a headlamp system.

In one aspect, the at least one vehicle device comprises a headlamp system and the following configuration is carried out in the case of at least one of the following sub-functions of the headlamp system by the respective configuration data set.

In the case of an adaptive headlamp light, the distance from an illumination gap to a detected road user or other vehicle can be set in the aforementioned manners such that the distance is always greater than a predefined minimum distance. In other words, a safety distance in relation to the alignment or adjustment of a cut-off point is defined around the respective road user or the respective other vehicle in order to advantageously avoid dazzling a driver and/or a camera in the other vehicle as a result. In connection with a marker light for traffic objects at the roadside, it can be predefined that a traffic object is lit up or illuminated only when it has a minimum object size. This advantageously ensures that the traffic object is at least partially illuminated by a marker light. In the case of a traffic object that is too small, the marker light can otherwise be directed past the traffic object when the self-calibration is still incomplete.

In connection with a lighting set-up, i.e., for example, a projection of a light symbol onto a road surface, a selection of the light pattern projected onto the projection area (for example the road surface) of the driving environment can be controlled or defined. This ensures that a suitable light pattern is used depending on the progress value of the self-calibration, wherein the light pattern can be projected in this state of progress without, for example, presenting a distorted appearance. The marker light can, for example, be a glare control for a sign to illuminate a traffic sign identified by a roadmap and/or an image processing of a camera image of the motor vehicle.

A further sub-function which can be controlled or configured by the configuration data set is a track light, the width and/or illumination distance (maximum distance of the cut-off point) of which can similarly be controlled depending on the progress value:

- in the case of an adaptive high beam, a distance from an illumination gap to another detected vehicle,
- in the case of a marker light for traffic objects at the roadside, a minimum object size,
- in the case of a lighting set-up, a selection of a light pattern projected onto a projection area of a vehicle environment.

In one aspect, the at least one vehicle device comprises a control unit for automated lane guidance (lane assist functionality) and the following configuration is carried out by the respective configuration data set in the case of at least one of the following sub-functions of the control unit: in the case of an automated lane assist function, a maximum permitted deviation from a center line of a lane, from which a return guidance to the center of the lane takes place. The closer the motor vehicle is guided toward an edge of a lane (track), the more precise the measurement of the environment of motor vehicle must be. If, for example, an environment detection is also included as an ancillary device in the self-calibration, i.e. the progress value is not yet, for example, at the maximum value, so that the self-calibration routine is still performing an adjustment or calibration, it can be advantageous to keep the lane guidance closer to the center line of the lane or to allow driving in a narrower band around the center line of the lane so that an approach to a possibly imprecisely identified lane marking is avoided.

A further question which the invention addresses is the conversion of the calibration state data into the progress value which can be used for the selection from the configuration data sets.

In one related aspect, the calibration state data signal a position indication for a geoposition of at least one traffic object in a vehicle environment, and the progress value is calculated as a function of a difference between the position indication and a target indication. The progress of a self-calibration of an environment detection or environment monitoring can thus be checked. If, for example, the position of the motor vehicle relative to traffic objects in the environment is determined by a camera and image processing, and this is converted into an absolute geoposition (based on the relative position and the geoposition of the motor vehicle determined by a receiver for a position signal of a GNSS (Global Navigation Satellite System), for example of the GPS), the geoposition of a traffic object determined in this way can be compared with a target indication which can be obtained, for example, from a digital roadmap. The difference between the position indication and the target indication is a measure of the localization accuracy that can currently be achieved for the at least one traffic object with the current progress of the self-calibration routine. The difference can be mapped, for example, by a mapping characteristic curve onto a progress value which can be defined, for example, within a range from zero percent to 100 percent.

In one aspect, the calibration state data signal a correction step width that has been used by the self-calibration routine in a previous iteration, and the correction step width or an average step width or a time gradient of the time characteristic of a plurality of previous correction step widths is determined and is converted into the progress value by a predetermined mapping function, i.e. the evaluation rule. It has been observed as advantageous for a self-calibration routine to perform correction steps iteratively or repeatedly and thereby then check the last correction step in order to gauge the improvement resulting from the adjustment of the vehicle device and/or the ancillary device. The more precisely a vehicle device/ancillary device operates or functions according to a predefined calibration measure, the smaller the further correction steps will turn out to be. This can advantageously be used as a measure of the progress of the self-calibration.

Three different approaches have proven advantageous here. The correction step width itself, for example the amount thereof, can be used. Additionally or alternatively, a correction step width of a plurality of consecutive iterations can be used to calculate an average step width, i.e. an average value. This measure has proven to provide particularly robust evidence. Additionally or alternatively, a time gradient of the values of the correction step width over a plurality of consecutive iterations can be determined. The time gradient or the slope of this time characteristic gives a measure of the asymptotic approach to a target calibration, so that an anticipated development of the further step width over time can be estimated. In other words, the setting behavior of the self-calibration routine or the self-calibration can be estimated on the basis of the gradient. Depending on the gradient, it is possible to establish whether a clear improvement has also occurred in the mode of operation of the vehicle device and/or the ancillary device, or whether the vehicle device/ancillary device has already achieved its full functional potential or its functional capability completely or sufficiently enough (gradient value less than a threshold value), and the sub-function can be enabled.

One aspect comprises outputting feedback relating to the progress value and/or to the configuration data set which is currently being used via an output device to a user of the motor vehicle. The user can thereby be prevented from erroneously expecting a predefined sub-function to be available to him. When the user recognizes from the progress value that a self-calibration routine has not yet been fully completed, he can infer or recognize accordingly that a sub-function depending thereon is not yet enabled.

One aspect comprises installing the vehicle device in question with its self-calibration routine and/or the respective ancillary device with its self-calibration routine in the motor vehicle in the uncalibrated or partially calibrated state and, following the installation, operating the respective self-calibration routine in a driving mode of the motor vehicle in order to finalize the calibration. This advantageously reduces the manufacturing costs of the motor vehicle, since the motor vehicle can already be handed over to a user or released for use, even when no complete calibration, i.e. no complete adaptation to the motor vehicle and/or to the installation position, has yet been provided for the vehicle device and/or the ancillary device. This can then be remedied during the driving operation.

As a further solution, the invention comprises a processor circuit which is configured to carry out an embodiment of the method according to the invention. For this purpose, the processor circuit can have at least one microprocessor and/or at least one microcontroller and/or at least one FPGA (Field Programmable Gate Array) and/or at least one DSP (Digital Signal Processor). The processor circuit can further have program code which, when executed by the processor circuit, is configured to carry out the embodiment of the method according to the invention. The program code can be stored in a data memory of the processor circuit.

In one aspect, the processor circuit comprises at least one control unit and/or a central computer for a motor vehicle and/or a backend server for the Internet. The processor circuit can be provided, for example, by a control unit or a combination of a plurality of control units in the motor vehicle. Additionally or alternatively, a central computer or head unit of the motor vehicle can be used to provide the processor circuit. A head unit represents a computer in the motor vehicle which can be freely programmed by software for a plurality of different control tasks. Additionally or alternatively, support can be provided from outside the vehicle by a backend server which can be operated in a stationary manner and can be coupled to the motor vehicle via a communication connection. The communication connection can be based, for example, on an Internet connection and/or a mobile radio connection.

As a further example, an aspect of the invention comprises a motor vehicle having an embodiment of the processor circuit according to the invention. The motor vehicle according to the invention is for example designed as an automobile, in particular a passenger automobile, or a truck, or as a passenger bus or motorcycle.

An aspect of the invention also comprises the combinations of the features of the described embodiments. An aspect of the invention therefore also comprises implementations which in each case have a combination of the features of a plurality of the described embodiments, insofar as the embodiments have not been described as mutually exclusive.

BRIEF DESCRIPTION OF THE DRAWINGS

These and other aspects and advantages will become more apparent and more readily appreciated from the following description of the exemplary embodiments, taken in conjunction with the accompanying drawings of which.

DETAILED DESCRIPTION

Figure 1:
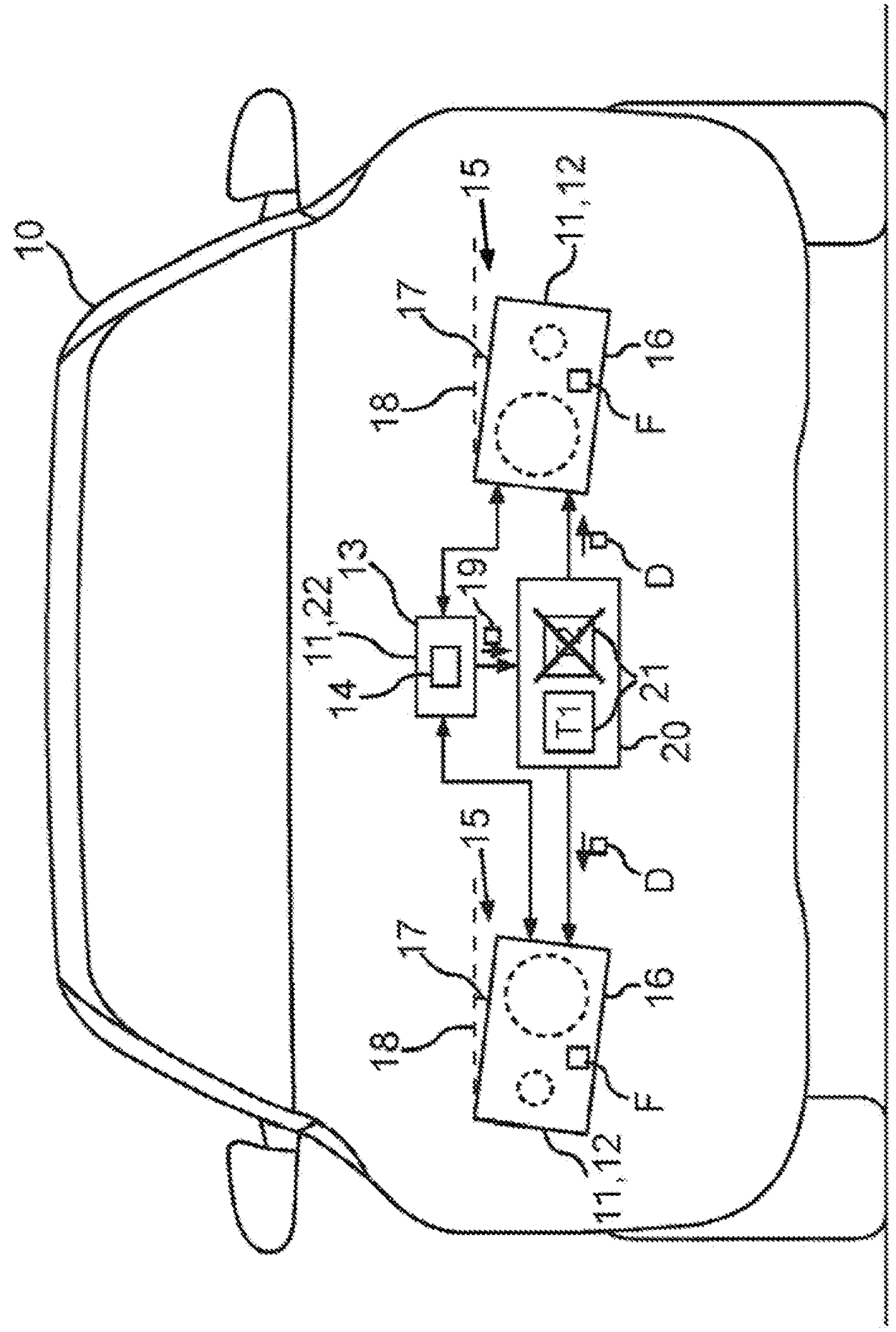
FIG. 1 shows a schematic view of one example embodiment of the motor vehicle according to the invention.

Reference will now be made in detail to the preferred embodiments, examples of which are illustrated in the accompanying drawings, wherein like reference numerals refer to like elements throughout.

The exemplary embodiments explained below are preferred embodiments of the invention. In the exemplary embodiments, the described components of the embodiments in each case represent individual features of the invention which are to be considered independently from one another and which each case develop the invention independently from one another. The disclosure is therefore also intended to comprise combinations of the features of the embodiments other than those illustrated. Furthermore, the described embodiments can also be supplemented with more of the features of the invention already described.

The same reference signs in each case denote functionally identical elements in the figures.

FIG. 1 shows an example of a motor vehicle 10 which can be an automobile, in particular a passenger automobile or truck. A vehicle device 11 which, in the example, can be a headlamp system 12 can be provided in the motor vehicle 10. A control unit 13 can be associated with the vehicle device 11.

A self-calibration routine 14 can be carried out in the vehicle device 11, for example by the control unit 13. The self-calibration routine 14 can be carried out, for example, during a driving operation of the motor vehicle 10 while the motor vehicle 10 is already being used by a user, i.e. after the motor vehicle 10 has been handed over to a user. The self-calibration routine 14 can be provided, for example, so that an actual installation position 15 of the vehicle device 11 or at least of a component of the vehicle device 11 is determined and is then operated or calibrated according to the identified installation position in order e.g. to compensate for a tilted position. In the example of the headlamp system 12, it is possible to determine, for example, how headlamps 16 are installed in the motor vehicle 10. An installation angle 17, for example, which describes a tilted position of the headlamps 16, for example in relation to a horizontal line 18, can be determined, wherein this is an example provided for illustrative purposes only.

When the installation position 15 is determined by the self-calibration routine 14 during the driving operation, a tilted position or a different specific installation position 15 deviating from a target location or target position can be compensated accordingly. The self-calibration routine 14 can be performed iteratively and current calibration state data 19 can be provided which represent or describe the current calibration state or the actual progress of the calibration. The calibration state data 19 can be received, for example, by a processor circuit 20 which can decide, depending on the calibration state data 19, which sub-functions 21 are intended to be enabled or blocked in the vehicle device 11. A sub-function 21 should be a blocked when the self-calibration routine 14 has not yet carried out the self-calibration sufficiently enough or to a sufficiently advanced extent. FIG. 1 shows, for example, that two sub-functions T1, T2 are provided for the vehicle device 11, for example the headlamp system 12. Whereas the sub-function T1 is already available or is activated depending on the current calibration state data 19 so that a user can select it for activation, the sub-function T2 is blocked or barred in the state shown in FIG. 1, i.e. it cannot be activated or selected by the user in the current calibration state of the vehicle device 11. A self-calibration routine 14 can be derived here from the prior art, where self-calibration routines in conjunction with, for example, headlamp systems and/or cameras and/or driver assistance systems are known.

In particular, however, it is provided instead not to block a sub-function T1, T2, i.e. a sub-function 21, completely, but rather to set at least one function parameter F in the vehicle device 11, i.e., for example, the headlamp system 12, by a respective function data set D, with a respectively suitable value for the sub-function 21 which corresponds to or takes account of the current calibration state or the current progress of the self-calibration routine.

In other words, a configuration data set D can be selected from a plurality of provided or prepared configuration data sets 26 depending on the respective current calibration state data 19, and at least one function parameter F can therefore be set or configured in the manner described in the vehicle device 11.

Figure 2:
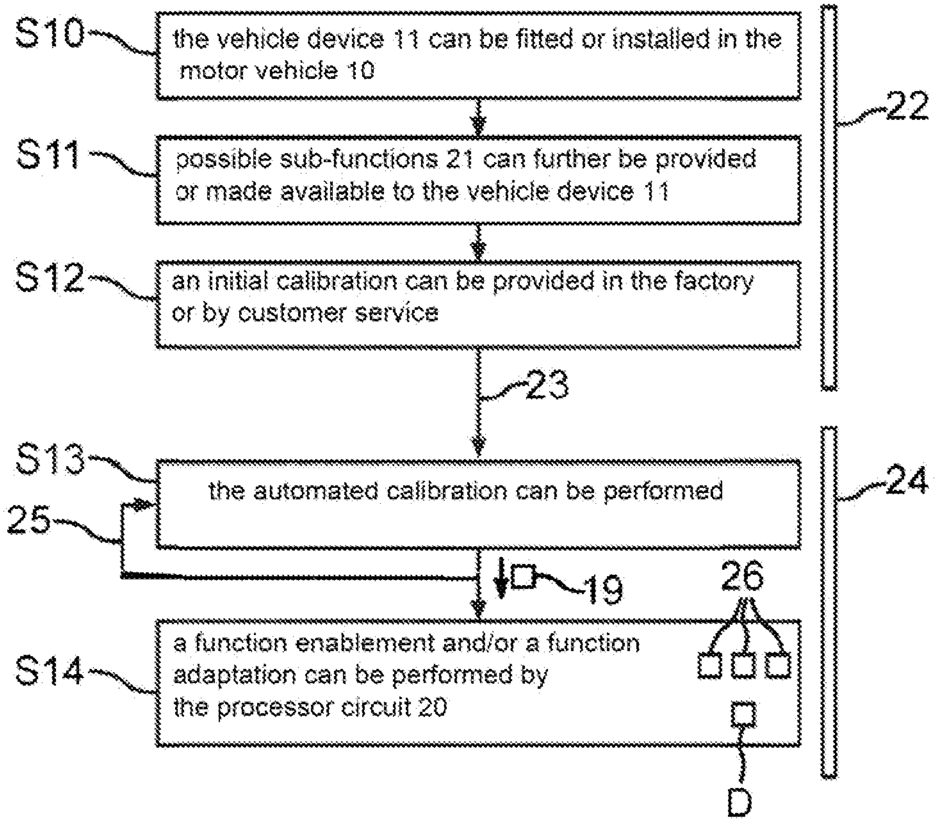
FIG. 2 shows a flow diagram of one example embodiment of the method according to the invention.

FIG. 2 illustrates an example of how the motor vehicle 10 can be operated on the basis of the processor circuit 20. During a production process or manufacturing process 22, the vehicle device 11 can be fitted or installed in the motor vehicle 10 in a process S10, i.e. the headlamp system 12, for example, can be installed in the motor vehicle 10. This results in an installation position 15 which, for example, can be characterized by the installation angle 17.

The possible sub-functions 21 can further be provided or made available to the vehicle device 11, for example a headlamp system 12, by a data configuration in a process S11, wherein, however, the sub-functions are then still blocked or deactivated.

In a process S12, an initial calibration can be provided in the factory or by customer service. A handover 23 to a user can then take place. During a driving operation 24 which the user carries out with his motor vehicle 10, the automated calibration can be performed in a process S13 by the self-calibration routine 14. This can be carried out in a plurality of iterations 25. Depending on the resulting calibration state data 19, a function enablement and/or a function adaptation can be performed by the processor circuit 20 in a process S14 by suitable function parameters F, in each case according to the current state of the self-calibration routine 14 or the progress of the self-calibration.

Figure 3:
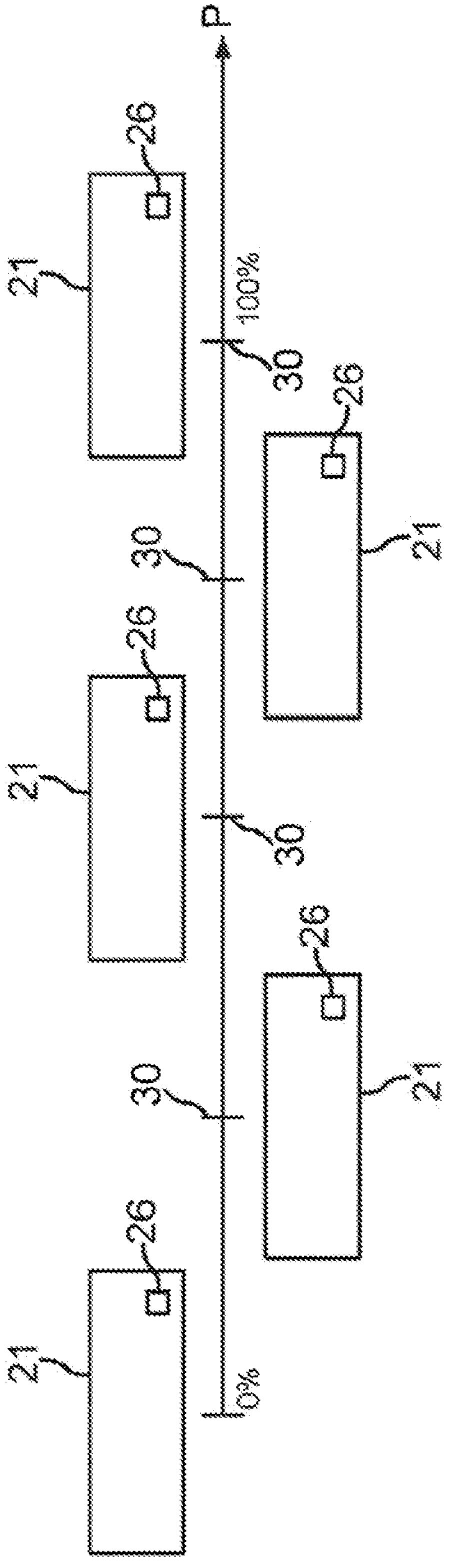
FIG. 3 shows a diagram illustrating an example of an enablement of sub-functions depending on a progress value.

FIG. 3 illustrates an example of how an enablement and/or a suitable configuration data set D can be selected depending on a calibration quality which can be expressed as a progress value P of the self-calibration routine 14, in each case for at least one sub-function 21. This is described in more detail below on the basis of the example of the headlamp system 12. The progress value P can be specified or defined, for example, in a value interval from zero percent to 100 percent, wherein 0 percent can represent the state without calibration or following the initial calibration from process S12 (see FIG. 2), whereas 100 percent can describe the successful completion of the self-calibration routine 14 in the motor vehicle 10.

For a plurality of different threshold values 30, a configuration data set 26 can be provided in each case for at least one sub-function 21. For P=0 percent, for example, a simple enablement of the high beam (binary, non-dynamic high beam) and/or a provision of a projection or a light pattern can be provided. For P=25 percent (value purely by way of example), at least one further light pattern can be provided. Additionally or alternatively, a resolution increase can be provided for the light pattern from P=0 percent, and this can be set with a corresponding configuration data set 26. For P=50 percent (value by way of example), a matrix LED headlamp function (LED-Light Emitting Diode), for example, can be enabled and/or can be configured with a configuration data set 26.

Additionally or alternatively, a sign glare control can be configured. For P=75 percent (value by way of example), a gap size for dynamic high beam (distance from the cut-off point to the oncoming vehicle), for example, can be reduced compared with the previous configuration data sets. Additionally or alternatively, an illumination width can be reduced compared with the previous configuration data sets 26. For P=100 percent (value by way of example), the gap size, for example, can be configured to a minimum value. Additionally or alternatively, an illumination width for the sign glare control can be set to a minimum value, since the maximum precision is then available.

Figure 4:
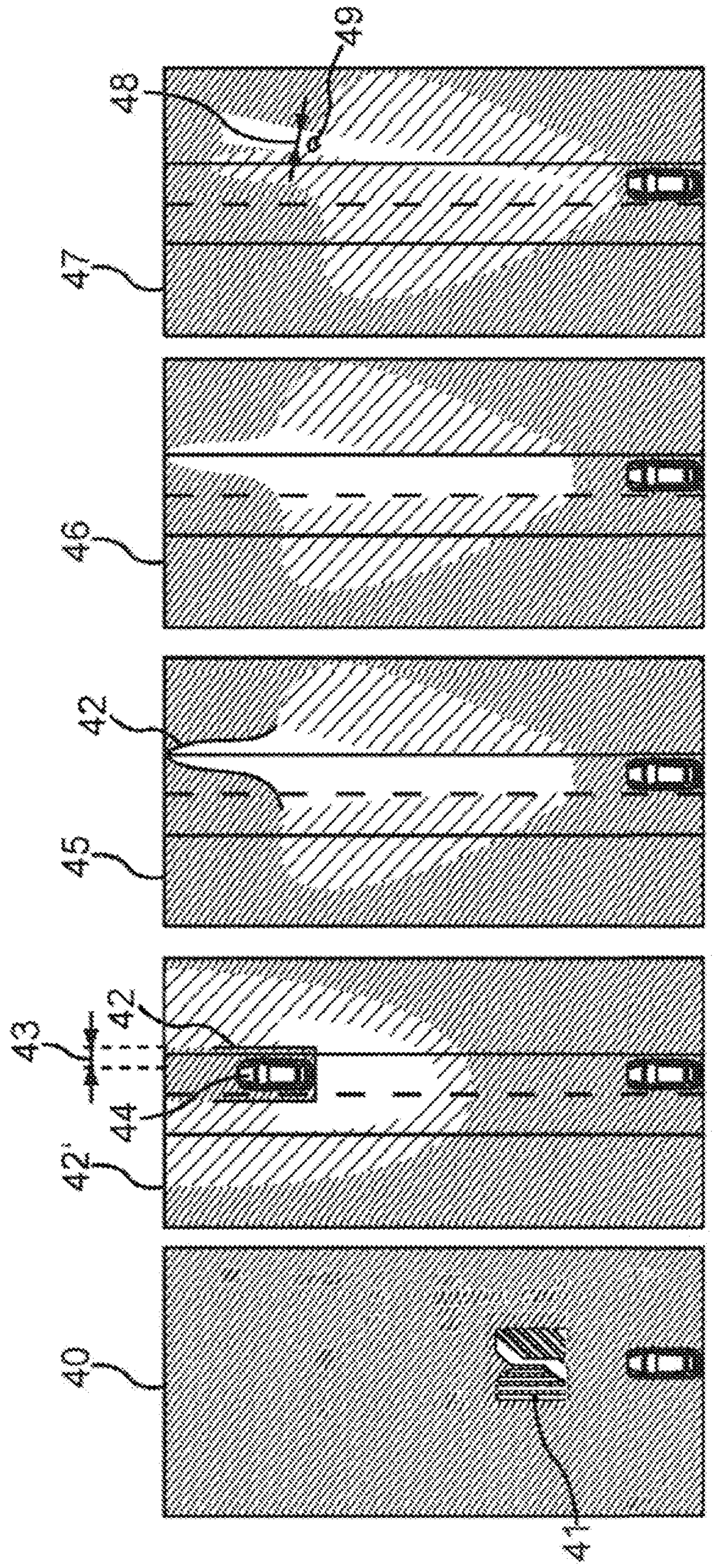
FIG. 4 shows a diagram illustrating an example of possible sub-functions, as they can be electively enabled or blocked in the motor vehicle shown in FIG. 1 according to the method shown in FIG. 2.

FIG. 4 illustrates an example of possible function parameters which can be configured by a respective configuration data set. This illustration uses the example of the described headlamp system 12.

By a lighting set-up 40 or projection 40, a light pattern 41 can be projected by the headlamp system onto a surface under a vehicle. The selection of the light pattern and/or a pixel resolution or pixel size can be configured by a configuration data set. A glare-free high beam 41 as a sub-function can provide that, in the case of a high beam illumination, a cut-off point 42 has a predetermined distance 43 to another vehicle in front or oncoming vehicle 44. This distance 43 can be modified or varied by a configuration data set. A track light 45 can be configured, for example, in relation to a path of the cut-off point 42. Additionally or alternatively, an orientation light 46 can be configured. A marker light 47 can be configured, for example, in relation to an angular resolution or width 48 for a sign glare control of a detected traffic sign 49.

An alternative approach to function enablement is therefore described within the framework of this concept. A professional installation of the headlamp, projector, rear light by production/customer service is ensured (S10). The data configuration of the control units is further performed (S11). However, the calibration is omitted or is carried out with rough precision (e.g. adjustment, process S12). This saves time in production and customer service. The resulting costs are therefore at least partially eliminated. During driving operation, an automatic calibration takes place (e.g. according to DE 10 2013 105 506 A1). The algorithm successively determines the incorrect setting of the light module or headlamp. Depending on the calibration quality according to the calibration state data 19, resulting e.g. from the variation between the calibration results, the light functions are sequentially enabled or their performance is improved. For example: a headlamp with a matrix LED functionality is exchanged in customer service. The cut-off point of the low beam is set to the prescribed value. A remaining tolerance is then assumed for the coupling of the low-beam and high-beam module. The gap around road users that is to be masked is therefore initially increased. In ongoing driving operation, an automatic calibration determines the headlamp setting with increasing quality. The gap size can be successively reduced depending on this quality parameter. The performance of the adaptive high beam increases.

An enablement of light functions such as marker light, sign glare control, ground projections, track light, etc. as from a specific calibration quality is similarly conceivable.

The costs for production and customer service for commissioning the lighting system therefore advantageously fall.

A calibration quality is expressed with the progress value P. This provides evidence of the quality of the calculated incorrect setting. The variation in the calibration results can be used, for example, when the result approximates the "true" incorrect setting. The format of the calibration quality can be chosen as required. The calibration algorithm, for example, generates a quality signal in the range from 0% (no calibration is carried out) to 100% (negligible deviance in the result). When the calibration quality exceeds parameterizable threshold values 30, the light functions are progressively enabled or their configuration is adapted.

The number of enablement/optimization steps is freely selectable. The initial (where appropriate permanent) enablement of light functions is also possible. Specific light functions are not explicitly defined within the framework of this concept. The method is conceivable for all (calibration-relevant) light functions. A blocking of functions according to the calibration quality is also to be provided. To provide information relating to the instantaneous learning status, feedback can be implemented for the customer, e.g. the customer has the facility to query the instantaneous commissioning state via the vehicle settings. This should be communicated attractively and as vehicle intelligence. Assuming that a function is enabled by the customer or customer service (e.g. function on demand), a warning, when necessary a blocking of the function, is possible when the function is not enabled.

The adaptation of functional characteristics is for example performed depending on the calibration quality, in particular the adaptation of the gap size of the matrix beam or the textural configuration of high-resolution projection systems. A configuration of this type permits early function enablement with increasing optimization, since a (possibly restricted) functional scope can already be provided with the currently available calibration quality according to the progress value.

The successive enablement and blocking of sub-functions such as sign glare control, matrix LED, etc., depending on a calibration quality (in both directions, increasing vs. decreasing quality)) are preferred possible uses.

Modification of the functional configuration depending on calibration quality (in both directions (increasing vs. decreasing quality)) is possible by configuration data sets. This includes, for example, adaptation of the gap size of the matrix beam (large gaps with low calibration quality and narrow gaps with high quality) or the textural configuration of high-resolution projection systems (e.g. low-detail or broad textures with low calibration quality and high-detail or narrow textures with high quality).

An automatic calibration can be evaluated in the driving operation. The algorithm of the self-calibration routine successively determines the incorrect setting of the light module. Depending on the calibration quality which results e.g. from the variation between the calibration results, the light functions are sequentially enabled or their performance is improved.

On the whole, the examples show how an approach to the function enablement of light functions can be provided depending on calibration quality.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide* v. *DIRECTV*, 358 F3d 870, 69 USPQ2d 1865 (Fed. Cir. 2004).

The invention claimed is:

1. A method for controlling a configuration state of at least one vehicle device of a motor vehicle, comprising:

during driving operation of the motor vehicle, executing an automated calibration of the at least one vehicle device by iteratively executing, by a processor circuit, a self-calibration routine on the at least one vehicle device based on a progress value of self-calibration of the at least one vehicle device based on the self-calibration routine, the self-calibration routine comprising:

receiving once or repeatedly, by the processor circuit, calibration state data from a calibration device of the vehicle device and/or of an ancillary device used by the vehicle device, wherein the calibration state data includes a current calibration state of a self-calibration routine performed by the calibration device during a driving operation of the motor vehicle;

assigning, by the processor circuit, the progress value to the respective current calibration state data in accordance with a predefined evaluation rule, a range of the progress value being from zero percent to 100 percent;

selecting a configuration data set which defines a configuration state of the vehicle device from a plurality of predefined configuration data sets depending on the current progress value; and configuring the vehicle device by the selected configuration data set, wherein at least one function parameter is set according to the respective configuration data set for the execution of least one sub-function of the vehicle device.

2. The method as claimed in claim 1, wherein the predefined evaluation rule comprises mapping the current calibration state data onto a predetermined value interval by which the progress of the self-calibration routine is described as a numerical value, and the progress value is thereby assigned to the calibration state data from the value interval.

3. The method as claimed in claim 2, wherein it is determined, by a threshold value comparison based on the determined progress value, which of the predefined configuration data sets is to be selected, wherein a different configuration data set of the configuration data sets is assigned in each case to a plurality of different threshold values.

4. The method as claimed in claim 2, wherein a parameter value of the at least one function parameter of the sub-function is set by the respective calibration data set in at least one sub-function, wherein a configuration of a feature of the sub-function and/or a safety distance for an adjustment procedure and/or an environment of use for the sub-function is set by the parameter value during an execution of the sub-function.

5. The method as claimed in claim 2, wherein the at least one vehicle device comprises a headlamp system and the following is configured in the case of at least one of sub-functions of the headlamp system by the respective configuration data set including:

(a) in the case of an adaptive high beam, a distance from an illumination gap to another detected vehicle, (d) in the case of a marker light for traffic objects at a roadside, a minimum object size, (e) in the case of a lighting set-up, a selection of a light pattern projected onto a projection area of a vehicle environment.

6. The method as claimed in claim 2, wherein the at least one vehicle device comprises a control unit for an automated lane guidance (lane assist functionality) and the following is configured in the case of at least one of sub-functions of a headlamp system by the respective configuration data set including:

in the case of an automated lane assist function, a maximum permitted deviation from a center line of a lane, from which a return guidance to the center of the lane takes place.

7. The method as claimed in claim 2, wherein the calibration state data include a position indication for a geoposition of at least one traffic object in a vehicle environment, and the progress value is calculated as a function of a difference between the position indication and a target indication.

8. The method as claimed in claim 2, wherein the calibration state data include a correction step width that has been used by the self-calibration routine in a previous iteration, and the correction step width or an average step width or a time gradient of a time characteristic of a plurality of previous correction step widths is determined and is converted into the progress value by the evaluation rule.

9. The method as claimed in claim 2, wherein feedback relating to the progress value and/or to the configuration data set which is currently being used is output via an output device to a user of the motor vehicle.

10. The method as claimed in claim 2, wherein the respective vehicle device with its self-calibration routine and/or the respective ancillary device with its self-calibration routine is installed in the motor vehicle in an uncalibrated or partially calibrated state and, following the installation, the respective self-calibration routine is operated in a driving mode of the motor vehicle in order to finalize the calibration.

11. The method as claimed in claim 1, wherein a parameter value of the at least one function parameter of the sub-function is set by the respective calibration data set in at least one sub-function, wherein a configuration of a feature of the sub-function and/or a safety distance for an adjustment procedure and/or an environment of use for the sub-function is set by the parameter value during an execution of the sub-function.

12. The method as claimed in claim 1, wherein the at least one vehicle device comprises a headlamp system and the following is configured in the case of at least one of sub-functions of the headlamp system by the respective configuration data set including:

(a) in the case of an adaptive high beam, a distance from an illumination gap to another detected vehicle, (b) in the case of a marker light for traffic objects at a roadside, a minimum object size, (c) in the case of a lighting set-up, a selection of a light pattern projected onto a projection area of a vehicle environment.

13. The method as claimed in claim 1, wherein the at least one vehicle device comprises a control unit for an automated lane guidance (lane assist functionality) and the following is configured in the case of at least one of sub-functions of a headlamp system by the respective configuration data set including:

in the case of an automated lane assist function, a maximum permitted deviation from a center line of a lane, from which a return guidance to the center of the lane takes place.

14. The method as claimed in claim 1, wherein the calibration state data include a position indication for a geoposition of at least one traffic object in a vehicle environment, and the progress value is calculated as a function of a difference between the position indication and a target indication.

15. The method as claimed in claim 1, wherein the calibration state data include a correction step width that has been used by the self-calibration routine in a previous iteration, and the correction step width or an average step width or a time gradient of a time characteristic of a plurality of previous correction step widths is determined and is converted into the progress value by the evaluation rule.

16. The method as claimed in claim 1, wherein feedback relating to the progress value and/or to the configuration data set which is currently being used is output via an output device to a user of the motor vehicle.

17. The method as claimed in claim 1, wherein the respective vehicle device with its self-calibration routine and/or the respective ancillary device with its self-calibration routine is installed in the motor vehicle in an uncalibrated or partially calibrated state and, following the installation, the respective self-calibration routine is operated in a driving mode of the motor vehicle in order to finalize the calibration.

18. A processor circuit, which is configured to carry out a method as claimed in claim 1.

19. The processor circuit as claimed in claim 18, wherein the processor circuit comprises at least one control unit and/or a central computer for a motor vehicle and/or a backend server for the Internet.

20. A motor vehicle having a processor circuit as claimed in claim 18.

* * * * *